(12) United States Patent
Waterman

(10) Patent No.: US 11,469,613 B2
(45) Date of Patent: Oct. 11, 2022

(54) SYSTEM FOR HOUSEHOLD ELECTRICAL MANAGEMENT AND CHARGING OF ELECTRIC VEHICLES AND/OR OTHER HIGH LOAD APPLIANCES

(71) Applicant: Loadshare Technologies Inc., Burnaby (CA)

(72) Inventor: Michael Waterman, Burnaby (CA)

(73) Assignee: Loadshare Technologies Inc., Burnaby (CA)

( * ) Notice: Subject to any disclaimer, the term of this patent is extended or adjusted under 35 U.S.C. 154(b) by 0 days.

(21) Appl. No.: 17/238,032

(22) Filed: Apr. 22, 2021

(65) Prior Publication Data

US 2021/0336477 A1  Oct. 28, 2021

Related U.S. Application Data

(60) Provisional application No. 63/014,120, filed on Apr. 22, 2020.

(51) Int. Cl.
*H02J 3/14* (2006.01)
*H02J 13/00* (2006.01)
*B60L 53/60* (2019.01)

(52) U.S. Cl.
CPC .. *H02J 13/00036* (2020.01); *H02J 13/00002* (2020.01); *B60L 53/60* (2019.02)

(58) Field of Classification Search
CPC .. H02J 13/00036; H02J 13/00002; H02J 3/14; H02J 3/322; H02J 5/00; H02J 13/00004; H02J 2310/12; B60L 53/60; B60L 53/22; B60L 2250/16; B60L 53/63; Y02B 70/30; Y04S 20/242

See application file for complete search history.

(56) References Cited

U.S. PATENT DOCUMENTS

| 8,933,670 B2 | 1/2015 | Ohtomo |
| 8,981,716 B2 | 3/2015 | Bianco |
| 9,090,175 B2 | 7/2015 | Bianco |

(Continued)

FOREIGN PATENT DOCUMENTS

| WO | 2011/078390 A1 | 6/2011 |
| WO | 2013/144947 A2 | 10/2013 |
| WO | 2016/197229 A1 | 12/2016 |

*Primary Examiner* — Rexford N Barnie
*Assistant Examiner* — Thai H Tran
(74) *Attorney, Agent, or Firm* — Todd A. Rattray; Oyen Wiggs Green & Mutala LLP

(57) ABSTRACT

A load-sharing device shares electrical load between a high-ranking load and a low-ranking load. A current transformer connected between a circuit breaker panel and the high-ranking load senses current draw. The current transformer closes a first switch when sufficient current is detected and opens the first switch otherwise. Low-voltage power is connected across nodes of the first switch. A control circuit is connected in parallel with the first switch to control one or more second switches connected between the circuit breaker panel and a low-ranking load. When there is current flow in the control circuit, the second switches are closed, thereby permitting power delivery to the low-ranking load and when there is no current flow in the control circuit, the one or more second switches are open circuited. When the first switch is closed, it provides a short circuit, thereby preventing current flow in the control circuit.

20 Claims, 3 Drawing Sheets

(56) References Cited

U.S. PATENT DOCUMENTS

| | | | |
|---|---|---|---|
| 9,434,268 B2 | 9/2016 | DeBoer et al. | |
| 10,471,846 B2 | 11/2019 | Chan et al. | |
| 10,486,539 B2 | 11/2019 | Corbeil et al. | |
| 10,840,735 B1* | 11/2020 | Cooper | H02J 13/00004 |
| 2006/0072262 A1* | 4/2006 | Paik | H02J 3/14 |
| | | | 361/62 |
| 2017/0008413 A1* | 1/2017 | Reineccius | H02J 3/322 |
| 2019/0070970 A1 | 3/2019 | Chan et al. | |
| 2020/0112199 A1 | 4/2020 | Rao | |

* cited by examiner

SYSTEM FOR HOUSEHOLD ELECTRICAL MANAGEMENT AND CHARGING OF ELECTRIC VEHICLES AND/OR OTHER HIGH LOAD APPLIANCES

REFERENCE TO RELATED APPLICATIONS

This application claims priority from, and the benefit under 35 USC 119 of, U.S. application No. 63/014,120 filed 22 Apr. 2020, which is hereby incorporated herein by reference.

TECHNICAL FIELD

This application pertains to systems for sharing electrical load within a building. Particular embodiments pertain to sharing an electrical load between relatively high-ranking loads (where power is desired on-demand, such as an electrical range, dryer, on-demand hot water heater and/or the like) and a relatively low-ranking load (where power can be supplied over time), such as an electrical vehicle, air conditioner, hot tube and/or the like.

BACKGROUND

Electric vehicles are becoming increasingly commonplace. However, existing systems within residential dwellings are often not well-equipped to accommodate the installation of electric vehicle supply equipment (EVSE) and typically require costly, specialized installations or upgrades from public utilities to provide a separate home-run circuit for supply power to EVSE Often, it is desirable to provide "on-demand" (e.g. instantaneous and/or continuous) power to some "high-ranking" building loads, such as ovens, dryers, on-demand hot water heaters and/or the like, but the power demands for these high-ranking loads is negligible during non-peak periods or when the devices are otherwise not being used. In contrast, other "low-ranking" loads, such as EVSE, hot tub heaters, air conditioners and/or the like may be provided power discontinuously and/or over time.

There may be a general desire to provide power to such low-ranking loads when the relatively high-ranking loads are not being used.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides an apparatus for sharing electrical load within a building having a circuit breaker panel connected to a power source and a high-ranking load connected to receive power from the power source through the circuit breaker panel via a plurality of first conductors connected between the circuit breaker panel and the high-ranking load. The apparatus comprises: a current transformer connected to one of the plurality of first conductors between the circuit breaker panel and the high-ranking load to sense current on the one of the plurality of first conductors, the current transformer operable to close a first switch between a pair of nodes when sufficient current is detected on the one of the plurality of first conductors and to open the first switch between the pair of nodes otherwise; a source of low-voltage power connected across the pair of nodes of the first switch; and a control circuit connected in parallel with the first switch, the control circuit controlling one or more second switches in one or more corresponding second conductors connected between the circuit breaker panel and a low-ranking load, such that when there is current flow in the control circuit, the one or more second switches are closed, thereby permitting power to be delivered from the circuit breaker panel to the low-ranking load on the one or more second conductors and when there is no current flow in the control circuit the one or more second switches are open circuited, thereby preventing power from being delivered from the circuit breaker panel to the low-ranking load on the one or more second conductors. When the first switch is closed, it provides a short circuit between the pair of nodes, thereby preventing current flow in the control circuit and, when the first switch is open, current flows in the control circuit.

The source of low-voltage power may comprise a AC transformer which transforms line voltage from the circuit breaker panel to provide AC low voltage power. The source of low-voltage power may comprise a DC power source which receives line voltage from the circuit breaker panel and outputs DC low voltage power.

The one or more second switches may comprise a plurality of switches and the one or more corresponding second conductors may comprise a plurality of second conductors.

The plurality of first conductors may be connected to a circuit breaker within the circuit breaker panel and the one or more second conductors may be connected to the same circuit breaker within the circuit breaker panel.

The control circuit may comprise a pair of branches connected in parallel with one another. A first branch may be connected through the coil of an interposing relay and a second branch may be connected through a relay switch of the interposing relay, such that current through the first branch controls an open or closed state of the relay switch. The state of the relay switch may be normally open, so that there is only current flow in the second branch if there is current flow in the first branch. The second branch may be connected through control terminals of a contactor comprising the one or more second switches. Current flow in the second branch may close the one or more second switches, thereby permitting power to be delivered from the circuit breaker panel to the low-ranking load on the one or more second conductors. The second branch is connected through one or more coils of one or more corresponding low-ranking load relays comprising the one or more second switches. Current flow in the second branch may close the one or more second switches, thereby permitting power to be delivered from the circuit breaker panel to the low-ranking load on the one or more second conductors. The one or more low-ranking load relays may comprise a pair of low-ranking load relays and the second branch may comprise the pair of coils of the pair of low-ranking load relays connected in series. The one or more low-ranking load relays may comprise a pair of low-ranking load relays. The second branch may comprise a corresponding pair of parallel-connected sub-branches, each sub-branch connected through the coil of a corresponding one of the pair of low-ranking load relays.

The control circuit may be connected through control terminals of a contactor comprising the one or more second switches. Current flow in the control circuit may close the one or more second switches, thereby permitting power to be delivered from the circuit breaker panel to the low-ranking load on the one or more second conductors.

The control circuit may be connected through one or more coils of one or more corresponding low-ranking load relays comprising the one or more second switches. Current flow in the control circuit may close the one or more second switches, thereby permitting power to be delivered from the circuit breaker panel to the low-ranking load on the one or more second conductors.

The first branch may be connected through a delay device which provides some delay from the time that first switch opens before current flows through the first branch.

Another aspect of the invention provides a method for sharing electrical load within a building having a circuit breaker panel connected to a power source and a high-ranking load connected to receive power from the power source through the circuit breaker panel via a plurality of first conductors connected between the circuit breaker panel and the high-ranking load. The method comprises: connecting a current transformer to one of the plurality of first conductors between the circuit breaker panel and the high-ranking load to sense current on the one of the plurality of first conductors, the current transformer operable to close a first switch between a pair of nodes when sufficient current is detected on the one of the plurality of first conductors and to open the first switch between the pair of nodes otherwise; providing a source of low-voltage power across the pair of nodes of the first switch; providing a control circuit in parallel with the first switch, the control circuit controlling one or more second switches; and connecting one or more corresponding second conductors: (a) between the circuit breaker panel and first nodes of the one or more second switches; and (b) between second nodes of the one or more second switches and a low-ranking load; such that when there is current flow in the control circuit, the one or more second switches are closed, thereby permitting power to be delivered from the circuit breaker panel to the low-ranking load on the one or more second conductors and when there is no current flow in the control circuit the one or more second switches are open circuited, thereby preventing power from being delivered from the circuit breaker panel to the low-ranking load on the one or more second conductors. When the first switch is closed, it provides a short circuit between the pair of nodes, thereby preventing current flow in the control circuit and, when the first switch is open, current flows in the control circuit.

The one or more second switches may comprise a plurality of switches and the one or more corresponding second conductors may comprise a plurality of second conductors.

The plurality of first conductors may be connected to a circuit breaker within the circuit breaker panel and connecting the one or more corresponding second conductors between the circuit breaker panel and first nodes of the one or more second switches may comprise connecting the one or more corresponding second conductors to the same circuit breaker as the first conductors within the circuit breaker panel.

The control circuit may comprises a pair of branches connected in parallel with one another. A first branch may be connected through the coil of an interposing relay and a second branch may be connected through a relay switch of the interposing relay, such that current through the first branch controls an open or closed state of the relay switch. The second branch may be connected through control terminals of a contactor comprising the one or more second switches. Current flow in the second branch my close the one or more second switches, thereby permitting power to be delivered from the circuit breaker panel to the low-ranking load on the one or more second conductors. The second branch may be connected through one or more coils of one or more corresponding low-ranking load relays comprising the one or more second switches. Current flow in the second branch may close the one or more second switches, thereby permitting power to be delivered from the circuit breaker panel to the low-ranking load on the one or more second conductors.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
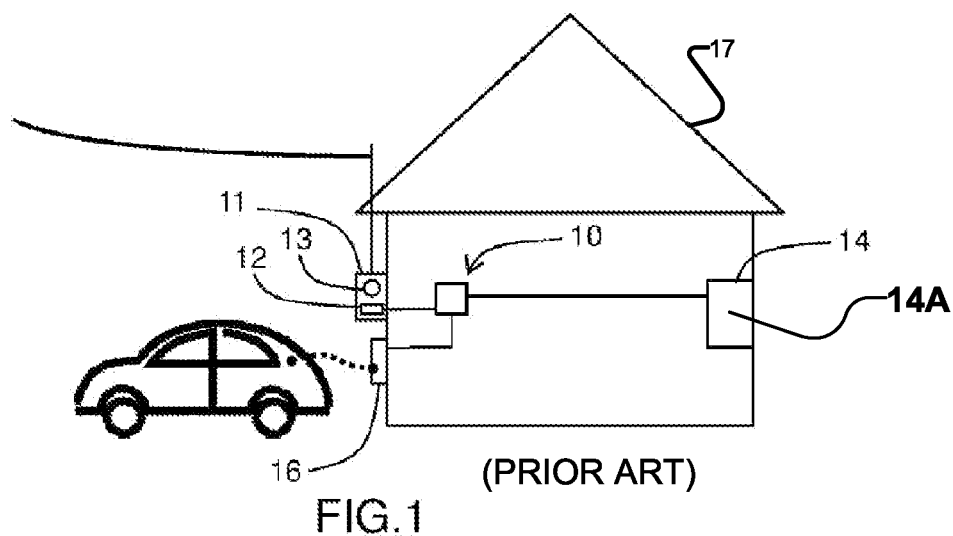
FIG. 1 is a schematic view of a prior art load-sharing device configuration.

FIG. 1 is a schematic view of the configuration of a prior art load-sharing device 10 for a building (e.g. household) 17 according to U.S. patent Ser. No. 10/486,539 issued 26 Nov. 2019 entitled CHARGE DEMAND CONTROLLER DEVICE. Load-sharing device 10 is configured to share electrical energy delivered to building 17 between: a main load 14 (e.g. an electrical circuit breaker panel 14A for building 17 and the loads (not shown) downstream of electrical circuit breaker panel 14A); and an external load 16. External load 16 may be an electric vehicle supply equipment (EVSE), air conditioner, hot tub, or the like. Power is provided to the building's main electrical load 14 (and circuit breaker panel 14A) via a main switch (AC power supply) 12, which is typically connected via a utility meter 13 in a utility service box 11. From main circuit breaker panel 14A, power is distributed to the other electrical loads (not shown) of building 17 downstream of circuit breaker panel 14A. Load-sharing device 10 is electrically disposed in line between main switch 12 and main load 14 of building 17 (i.e. upstream of main circuit breaker panel 14A).

In this FIG. 1 configuration, load-sharing device 10 supplants the building's main circuit breaker (typically embodied within circuit breaker panel 14A) to regulate power supplied to building 17. Load-sharing device 10 continuously monitors a total load current from an AC power source 12 to main circuit breaker panel 14A of building 17 and possibly also to external load 16. The total load current may be determined as either the largest one of the currents coming from different power lines or as the sum of these currents. When load-sharing device 10 detects that main load 14 is drawing a load current that is less than a predetermined threshold current for a predetermined threshold length of time, load-sharing device 10 operates a switch to supply remaining power to external load 16, while respecting a maximum total load (as between main load 14 and external load 16).

Figure 2:
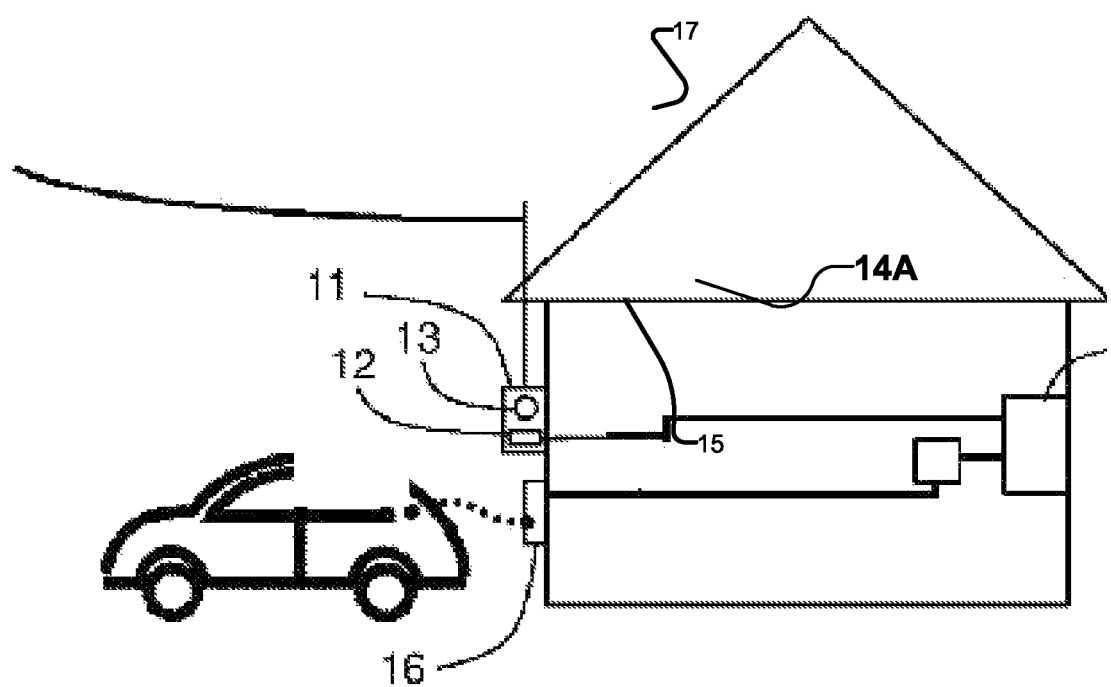
FIG. 2 is a schematic view of a load-sharing device configuration according to an example embodiment of the present invention.

FIG. 2 is a schematic view of a load-sharing device 15 configuration according to an example embodiment of the present invention. Load-sharing device 15 is electrically disposed in a branch circuit downstream from the main circuit breaker panel 14A of building 17. That is, in the FIG. 2 embodiment, AC power source 12 is connected to the building's main circuit breaker panel 14 and load-sharing device 15 is connected downstream of main circuit breaker panel 14 (on a side of main breaker panel 14A opposite that of AC power source 12) in a branch circuit that supplies power from main circuit breaker panel 14 to one, or the other, of relatively high-ranking load 29 and relatively low-ranking load 19. Low-ranking load 19 may comprise a EVSE, or some other relatively low ranking load, such as an air-conditioner, a hot tub and/or the like. Load sharing device 15 and low-ranking load 19 are connected in parallel to high-ranking load 29. Load-sharing device 15 permits delivery of power (or prevents delivery of power) only to low-ranking load 19 and does not interfere with the supply of power to main breaker panel 14A. In this configuration, load-sharing device 15 may be considered to function as a branch circuit breaker to low-ranking load 19.

Figure 3:
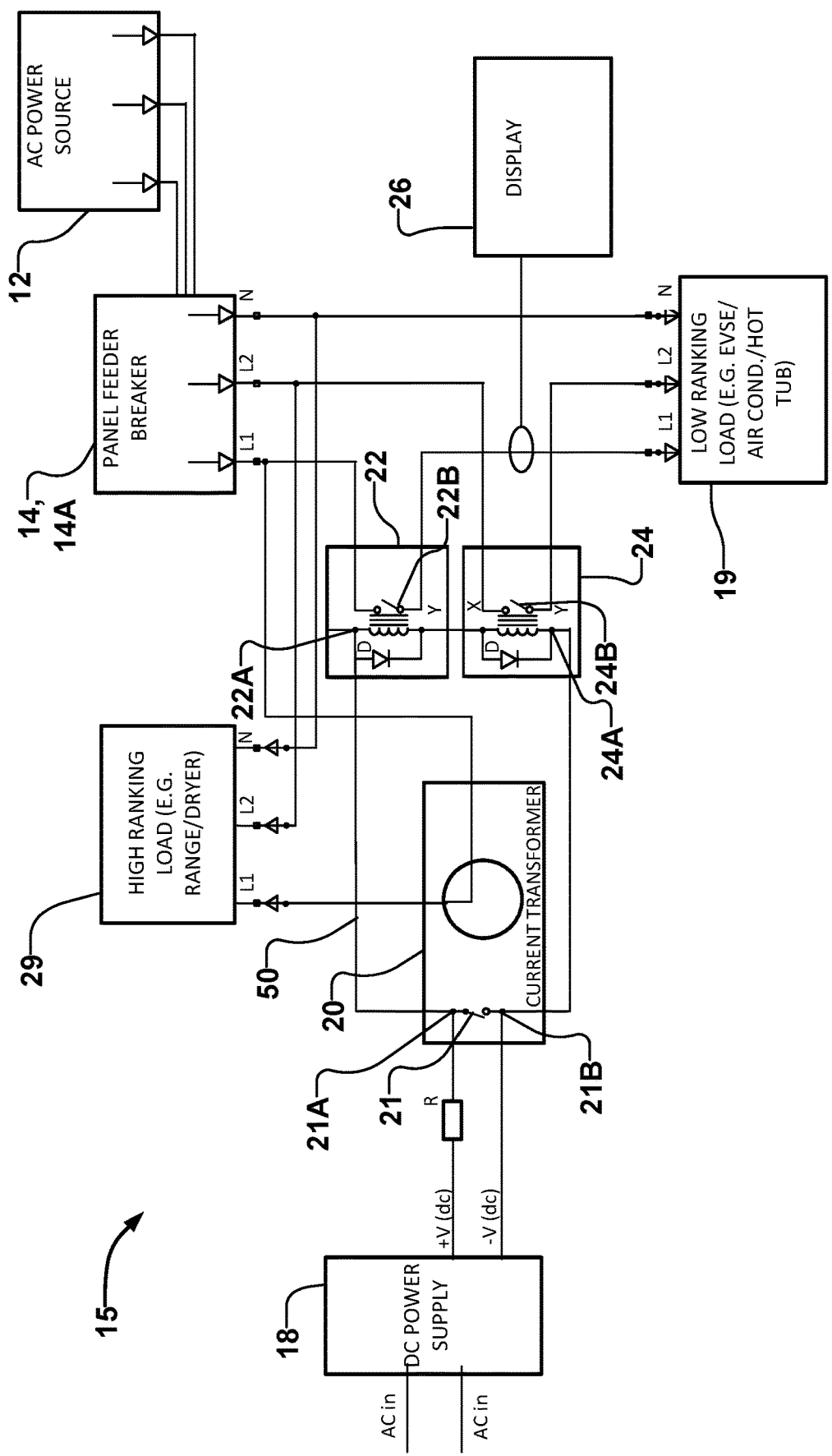
FIG. 3 is an electric schematic of the FIG. 2 load-sharing device according to a particular embodiment.

FIG. 3 is an electric schematic of load-sharing device 15 according to a particular embodiment. As illustrated, a DC power supply 18 receives AC power (e.g. line voltage from circuit breaker panel 14) and supplies low-voltage (e.g. +/−12V or some other low voltage level of DC power) power to self powered current transformer 20, which detects current being supplied to high-ranking load 29 via line L1. In some embodiments, current transformer 20 may be connected to detect current being supplied to high-ranking load 29 via line L2. Current transformer 20 may comprise an analog current transformer or digital current transformer.

In the illustrated embodiment of FIG. 3, conductors L1, L2 and N form the three conductors from building breaker panel 14 to high-ranking load 29 of building 17. It may be desirable to provide "on-demand" (e.g. instantaneous and/or continuous) power to high-ranking load 29. When high-ranking load 29 is drawing power, it may comprise a significant power draw of building 17. In some embodiments, high-ranking load may comprise an electrical range, a dryer, an on-demand hot water heater and/or the like. One of the conductors L1, L2 (in the illustrated embodiment, conductor L1) providing power from building breaker panel 14 to load 29 runs though current transformer 20. When current transformer 20 detects any current draw through L1 (i.e. by high-ranking load 29), current transformer 20 closes switch 21 to form a short circuit between the nodes 21A, 21B of switch 21 and to complete the circuit from DC power supply 18 (through resistance R). With the short circuit between nodes 21A, 21B of switch 21, current from DC power supply 18 does not flow through control circuit 50 to solid state relays 22 and 24. That is, when switch 21 is closed (in a conductive state), there is no substantial potential difference between nodes 22A, 24A and, consequently, there is no current flow in control circuit 50 which is connected therebetween (i.e. control circuit 50 is connected in parallel with switch 21 between nodes 21A, 22B or nodes 22A, 24A). In some embodiments, current transformer 20 closes switch 21 when any non-zero current is detected in L1. In some embodiments, current transformer 20 may comprise a non-zero (and possible user- and/or technician-configurable) L1 current threshold above which it closes switch 21.

When high-ranking load 29 is not drawing current through L1, switch 21 remains open (non-conductive) and creating a potential difference between nodes 22A, 24A of control circuit 50 and permitting current flow from DC power supply 18 through control circuit 50 and between nodes 22A, 24A of relays (e.g. solid state relays) 22, 24. This current flow through control circuit 50 and nodes 22A, 24A switches relays 22, 24 to an ON (conducting) configuration, where switches 22B, 24B between terminals (indicated as X and Y) of relays 22, 24 are closed and in conducting states. When relays 22, 24 are in this ON configuration and current is permitted to flow between their respective X and Y terminals, first and second conductors L1 and L2 are connected to deliver current from AC source 12 to low-ranking load 19. In contrast, when high-ranking load 29 draws current through conductor L1 and switch 21 of current transformer 20 is closed (conducting), there is no current flow in control circuit 50 between nodes 22A, 24A of relays 22, 24 and relays 22, 24 are in an OFF (non-conducting) configuration, where their respective switches 22B, 24B are open and conductors L1, L2 are both cut-off from low-ranking load 19. That is, when relays 22, 24 are in their OFF configuration, conductors L1, L2 to low-ranking load 19 are open circuits and there is no possibility of current flow from building breaker panel 14 to low-ranking load 19 on either one of conductors L1, L2. Switches 22B, 24B of relays 22, 24 may be normally open (i.e. non-conducting) to promote safety by preventing simultaneous current draw from high-ranking load 29 and low ranking low 19. The load switching performed by the above configuration of device 15 may be substantially instantaneous.

Optionally, relays 22, 24 may be replaced by a combination of LEDs and photodetector activated switches. In such embodiments, where current transformer 20 detects that no current is being drawn by high-ranking device 29 and switch 21 is open to create a potential difference between nodes 22A, 24A, the LEDs of such devices conduct current and emit light which is detected by their respective photodetector-activated switches and closes these switches to permit current flow on lines L1, L2 from breaker panel 14 to low-ranking load 19. In contrast, when there is current being drawn by high-ranking device 29 and switch 21 is closed, there is no potential difference (and no current flow) between nodes 22A, 24A, the diodes do not emit light and their respective switches are opened thereby open circuiting conductors L1, L2 to low-ranking device 19.

Load-sharing device 15 is advantageous over the prior art load-sharing device 10 because load sharing device 15 is self-powered, whereas prior art load-sharing device 10 relies on power from AC power source 12 and requires the implementation of additional logic circuits for detecting loads. Device 15 also advantageously does not rely on detecting the combined power consumption of main load (i.e. entire circuit breaker panel) 14 and external (EVSE) load 16 to determine whether power is to be supplied to low-ranking load 19, resulting in less susceptibility to measurement errors. Instead, device 15 is implemented in a branch breaker configuration (downstream of main breaker panel 14A) and, consequently, is only sensitive to power being drawing by high-ranking device. Load sharing device 15 is also hard-wired as opposed to relying on wireless communications which can be prone to communication failure and pose a safety hazard. Load-sharing device 15 also operates using analog electronics and does not require microcontrollers or other digital electronics which can be prone to failure when used in high power applications. Load-sharing device 15 may also advantageously be retrofit into building 17 using an existing circuit-breaker for an existing load (high-ranking load 29) in breaker panel 14. This feature of load-sharing device 15 can help to facilitate user (e.g. non-professional) installation and is particularly advantageous where circuit breaker panel 14 may be full and unable to accommodate another breaker. Another advantage of load-sharing device 15 is that the switches of relays 22, 24 are normally open (i.e. open circuited). Consequently, even in an event of a failure of load-sharing device 15 or some other failure of the electrical system of building 17, load-sharing device 15 can act as a safety device that prevents simultaneous power draw from both high-ranking load 29 and low-ranking load 19.

Optionally and advantageously, load-sharing device 15 may comprise a metering instrument (e.g. display) 26 which may display measurements (and/or other indicators) related to the voltage, current, and/or power consumption of low-ranking load 19. In the illustrated embodiment, metering instrument 26 measures activity from conductor L1 through the use of a current transformer for determining any relevant metrics.

In some embodiments, load-sharing device may optionally comprise a delay device 36 which may provide some delay from the time that switch 21 opens before current is supplied between nodes 22A, 24A to permit current flow to low-ranking load 19. Such a delay device 36 can mitigate nuisance switching of relays 22, 24 where high-ranking load 29 operates on an ON/OFF cycle.

Figure 4:
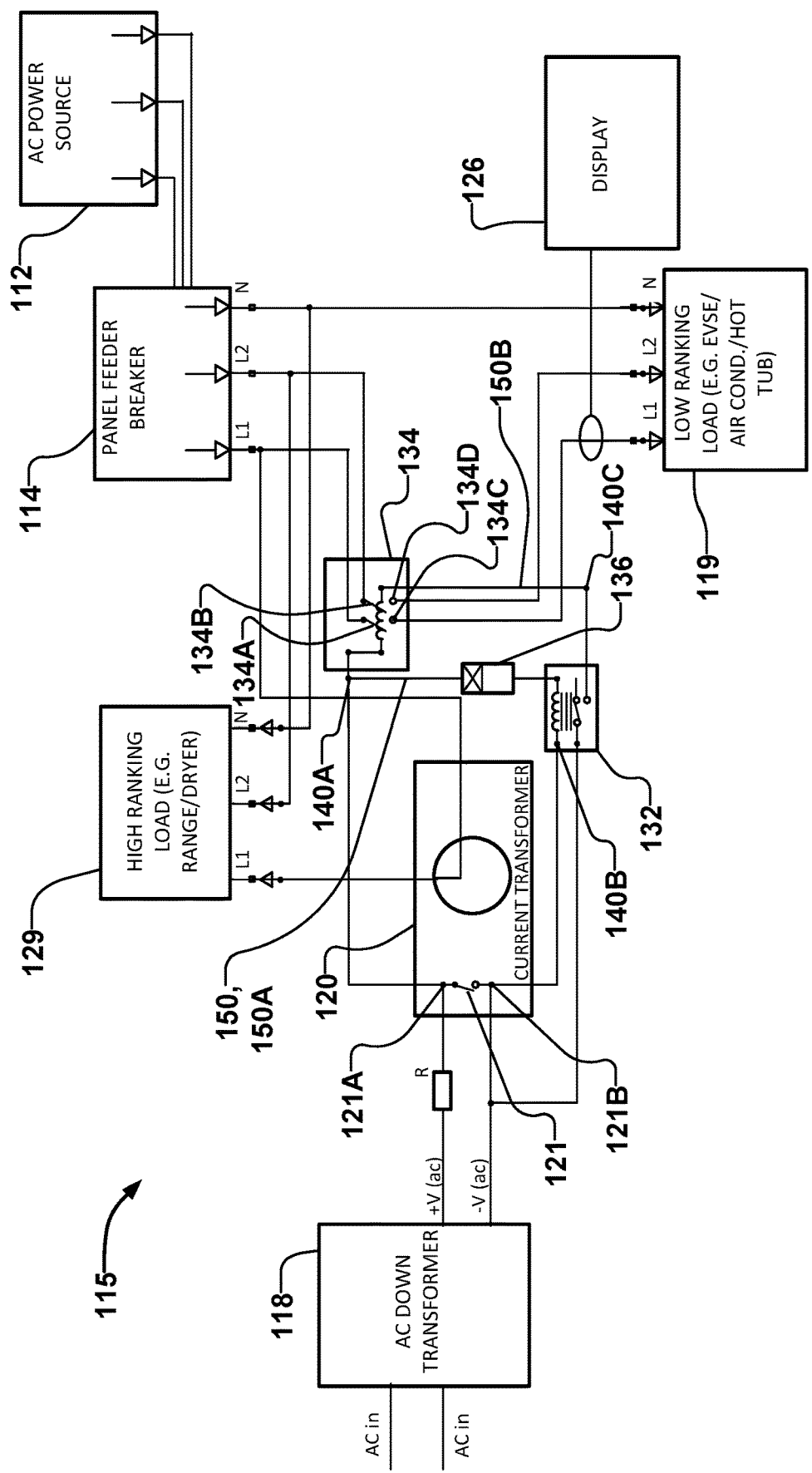
FIG. 4 is an electric schematic of the FIG. 2 load-sharing device according to another particular embodiment.

FIG. 4 is an electric schematic of a load-sharing device 115 according to another particular embodiment. In many respects, load-sharing device 115 is similar to load sharing device 15 described above. Unless this disclosure and/or the context dictates otherwise, load-sharing device 115 may have any of the features of load-sharing device 15 described herein. Load-sharing device 115 may be implemented in the configuration of load-sharing device 15 shown in FIG. 2.

Referring to FIG. 4, features of load-sharing device 115 and it corresponding circuit that are the same as those of load-sharing device 15 are shown with the same reference numerals. Load-sharing device 115 comprises an AC down transformer 118 which receives AC power (e.g. line voltage from circuit breaker panel 14) and supplies low-voltage AC power (e.g. +/−24V (AC) or some other suitable level of low voltage AC power) to self powered current transformer 20, which detects current being supplied to high-ranking load 29 via line L1. In some embodiments, current transformer 20 may be connected to detect current being supplied to high-ranking load 29 via line L2. Current transformer 20 may comprise an analog current transformer or digital current transformer.

In the illustrated embodiment of FIG. 4, conductors L1, L2 and N form the three conductors from building breaker panel 14 to high-ranking load 29 of building 17. One of the conductors L1, L2 (in the illustrated embodiment, conductor L1) providing power from building breaker panel 14 to load 29 runs though current transformer 20. When current transformer 20 detects any current draw through L1 (i.e. by high-ranking load 29), current transformer 20 closes switch 21 to form a short circuit between the nodes 121A, 121B of switch 121 and to complete the circuit from AC transformer 118 (through resistance R). With the short circuit between nodes 121A, 121B of switch 121, current from AC down transformer 118 does not flow through control circuit 150 comprising a first branch 150A comprising interposing relay 132 and a second branch 150B comprising contactors 134. That is, when switch 21 is closed (in a conductive state), there is no substantial potential difference between nodes 140A, 140B and, consequently, there is no current flow in branch 150A of control circuit 150 which is connected therebetween. Similarly, there is no substantial potential difference between nodes 140A, 140C and, consequently, there is no current flow in branch 150B of control circuit 150 which is connected therebetween. It will be appreciated from FIG. 4 and from the discussion above, that control circuit 150 of load-sharing device 115 comprises two branches 150A, 150B each of which is connected in parallel with switch 121 between nodes 121A, 121B or nodes 140A, 140B or nodes 140A, 140C. In some embodiments, current transformer 20 closes switch 21 when any non-zero current is detected in L1. In some embodiments, current transformer 20 may comprise a non-zero (and possible user- and/or technician-configurable) L1 current threshold above which it closes switch 21.

When high-ranking load 29 is not drawing current through L1, switch 21 remains open (non-conductive) and creating a potential difference between nodes 140A, 140B and permitting current flow from AC transformer 118 through branch 150A of control circuit 150 and through the coil of interposing relay 132. Interposing relay 132 is normally open (non-conducting) and closes only when there is a potential difference (and current flow) on branch 150A of control circuit 150 between nodes 140A, 140B. When high-ranking load 29 is not drawing current through L1 and interposing relay 132 closes (because of current flow through branch 150A), it creates a corresponding potential difference between nodes 140A, 140C on second branch 150B of control circuit 150 and permits a current flow therebetween. Current flow on second branch 150B of control circuit 150 between nodes 140A, 140C closes switches 134A, 134B of contactor 134, permitting current flow on lines L1, L2 from main circuit breaker panel 14 through contactor 134 to low-ranking load 19. In contrast, when high-ranking load 29 draws current through conductor L1 and switch 21 of current transformer 20 is closed (conducting), there is no current flow on either branch 150A, 150B of control circuit 150 between nodes 140A, 140B (so the switch of interposing relay 132 remains open) or between nodes 140A, 140C and switches 134A, 134B of contactor 134 are in an OFF (non-conducting) configuration, where conductors L1, L2 are both cut-off from low-ranking load 19. That is, when switches 134A, 134B of contactor 134 are in their OFF configuration, conductors L1, L2 to low-ranking load 19 are open circuits and there is no possibility of current flow from building breaker panel 14 to low-ranking load 19 on either one of conductors L1, L2. Switches 134A, 134B of contactor 134 may be normally open (i.e. non-conducting) to promote safety by preventing simultaneous current draw from high-ranking load 29 and low ranking low 19. The load switching performed by the above configuration of device 115 may be substantially instantaneous.

Load-sharing device 115 advantageously does not rely on detecting the combined power consumption of main load (i.e. entire circuit breaker panel) 14 and external (EVSE) load 16 to determine whether power is to be supplied to low-ranking load 19, resulting in less susceptibility to measurement errors. Instead, device 115 is implemented in a branch breaker configuration (downstream of main breaker panel 14A) and, consequently, is only sensitive to power being drawing by high-ranking device. Load-sharing device 115 is also hard-wired as opposed to relying on wireless communications which can be prone to communication failure and pose a safety hazard. Load-sharing device 115 also operates using analog electronics and does not require microcontrollers or other digital electronics which can be prone to failure when used in high power applications. Load-sharing device 115 may also advantageously be retrofit into building 17 using an existing circuit-breaker for an existing load (high-ranking load 29) in breaker panel 14. This feature of load-sharing device 115 can help to facilitate user (e.g. non-professional) installation and is particularly advantageous where circuit breaker panel 14 may be full and unable to accommodate another breaker. Another advantage of load-sharing device 115 is that switches 134A, 1348 of 134 are normally open (i.e. open circuited). Consequently, even in an event of a failure of load-sharing device 115 or some other failure of the electrical system of building 17, load-sharing device 115 can act as a safety device that prevents simultaneous power draw from both high-ranking load 29 and low-ranking load 19.

Optionally and advantageously, load-sharing device 115 may comprise a metering instrument (e.g. display) 26 which may display measurements (and/or other indicators) related to the voltage, current, and/or power consumption of low-ranking load 19. In the illustrated embodiment, metering instrument 26 measures activity from conductor L1 through the use of a current transformer for determining any relevant metrics.

In some embodiments, load-sharing device 115 may optionally comprise a delay device 136 (connected on first branch 150A) which may provide some delay from the time that switch 21 opens before current is supplied between nodes 140A, 1406 to permit current flow to low-ranking load 19. Such a delay device 136 can mitigate nuisance switching of switches 134A, 1346 of contactor 134 where high-ranking load 29 operates on an ON/OFF cycle.

Load-sharing devices 15, 115 may be retrofit to the electrical system of an existing building 17, which may be a residential or commercial building. Load-sharing device 15, 115 may be mounted to a convenient location that is permitted by local inspection authorities. One of the conductors (L1, L2) feeding high-ranking load 29 is spliced and the upstream (breaker-side) and downstream (load-side) of the conductor will be electrically connected to suitable connectors (e.g. lugs or the like) in an enclosure (not shown) of device 15, 115. Conductors (L1, L2) supplying power to low-ranking load 19 are connected, on the upstream (breaker-side) and downstream (load-side), to suitable connectors (e.g. lugs or the like) in the enclosure of device 15, 115. Once power is turned on, device 15, 115 operates autonomously. The other ends of the downstream (load-side) conductors (L1, L2) for low-ranking load 19 may be connected to a plug or other suitable connector at load 19. The upstream (breaker-side) conductors (L1, L2) for low-ranking load 19 may be connected at breaker panel 14 to the same circuit breaker as conductors (L1, L2) of high-ranking load 29. The other conductors (ground, neutral) for low-ranking load 19 may be made as home runs directly from low ranking load 19 to breaker panel 14.

Load-sharing device 15, 115 allows installation of a large low-ranking load 19 without having to upgrade either the electrical service to building 17 or having to add any circuit breakers into break panel 14. Load-sharing device 15, 115 incorporates a current transformer 20 and does not rely on any digital controllers or the like.

While a number of exemplary aspects and embodiments have been discussed above, those of skill in the art will recognize certain modifications, permutations, additions and sub-combinations thereof. For example:

load-sharing device 115 described above comprises a control circuit 150 having a pair of parallel branches 150A, 1508, wherein a first branch 150A is connected through interposing relay 132, such that second branch 1508 is only conducting after there is current flow in first branch 150A and through interposing relay 132, causing interposing relay 132 to complete the circuit of second branch 1508 which could control the operation of relays 22, 24. Load-sharing device 15 could be provided with a control circuit 50 having a similar pair of branches, a first of which could comprise a (normally open) interposing relay which can close to complete the circuit of the second branch 1508 through relays 22, 24.

DC low-voltage power supply 18 of load-sharing device 15 could be used with load-sharing device 115 (i.e. in the place of AC down transformer 118). Similarly, AC down transformer 118 of load-sharing device 115 could be used with load-sharing device 15 (i.e. in the place of DC voltage source 18).

Load-sharing device comprises a pair of relays 22, 24 having their respective coils connected in series as part of control circuit 50. In some embodiments, the coils of relays 22, 24 could be connected in parallel through a pair of parallel-connected branches of control circuit 50 of a pair of parallel-connected sub-branches of the second branch of control circuit 150.

It is therefore intended that the following appended claims and claims hereafter introduced are interpreted to include all such modifications, permutations, additions and sub-combinations as are consistent with the broadest interpretation of the specification as a whole.

The invention claimed is:

1. An apparatus for sharing electrical load within a building having a circuit breaker panel connected to a power source and a high-ranking load connected to receive power from the power source through the circuit breaker panel via a plurality of first conductors connected between the circuit breaker panel and the high-ranking load, the apparatus comprising:
   a current transformer connected to one of the plurality of first conductors between the circuit breaker panel and the high-ranking load to sense current on the one of the plurality of first conductors, the current transformer operable to close a first switch between a pair of nodes when sufficient current is detected on the one of the plurality of first conductors and to open the first switch between the pair of nodes otherwise;
   a source of low-voltage power connected across the pair of nodes of the first switch;
   a control circuit connected in parallel with the first switch, the control circuit controlling one or more second switches in one or more corresponding second conductors connected between the circuit breaker panel and a low-ranking load, such that when there is current flow in the control circuit, the one or more second switches are closed, thereby permitting power to be delivered from the circuit breaker panel to the low-ranking load on the one or more second conductors and when there is no current flow in the control circuit the one or more second switches are open circuited, thereby preventing power from being delivered from the circuit breaker panel to the low-ranking load on the one or more second conductors;

wherein when the first switch is closed, it provides a short circuit between the pair of nodes, thereby preventing current flow in the control circuit and, when the first switch is open, current flows in the control circuit.

2. The apparatus of claim 1 wherein the source of low-voltage power comprises a AC transformer which transforms line voltage from the circuit breaker panel to provide AC low voltage power.

3. The apparatus of claim 1 wherein the source of low-voltage power comprise a DC power source which receives line voltage from the circuit breaker panel and outputs DC low voltage power.

4. The apparatus of claim 1 wherein the one or more second switches comprise a plurality of switches and the one or more corresponding second conductors comprise a plurality of second conductors.

5. The apparatus of claim 1 wherein the plurality of first conductors are connected to a circuit breaker within the circuit breaker panel and the one or more second conductors are connected to the same circuit breaker within the circuit breaker panel.

6. The apparatus of claim 1 wherein the control circuit comprises a pair of branches connected in parallel with one another and wherein a first branch is connected through the coil of an interposing relay and a second branch is connected through a relay switch of the interposing relay, such that current through the first branch controls an open or closed state of the relay switch.

7. The apparatus of claim 6 wherein the state of the relay switch is normally open, so that there is only current flow in the second branch if there is current flow in the first branch.

8. The apparatus of claim 6 wherein the second branch is connected through control terminals of a contactor comprising the one or more second switches and wherein current flow in the second branch closes the one or more second switches, thereby permitting power to be delivered from the circuit breaker panel to the low-ranking load on the one or more second conductors.

9. The apparatus of claim 6 wherein the second branch is connected through one or more coils of one or more corresponding low-ranking load relays comprising the one or more second switches and wherein current flow in the second branch closes the one or more second switches, thereby permitting power to be delivered from the circuit breaker panel to the low-ranking load on the one or more second conductors.

10. The apparatus of claim 9 wherein the one or more low-ranking load relays comprise a pair of low-ranking load relays and wherein the second branch comprises the pair of coils of the pair of low-ranking load relays connected in series.

11. The apparatus of claim 9 wherein the one or more low-ranking load relays comprise a pair of low-ranking load relays and wherein the second branch comprises a corresponding pair of parallel-connected sub-branches, each sub-branch connected through the coil of a corresponding one of the pair of low-ranking load relays.

12. The apparatus of claim 1 wherein the control circuit is connected through control terminals of a contactor comprising the one or more second switches and wherein current flow in the control circuit closes the one or more second switches, thereby permitting power to be delivered from the circuit breaker panel to the low-ranking load on the one or more second conductors.

13. The apparatus of claim 1 wherein the control circuit is connected through one or more coils of one or more corresponding low-ranking load relays comprising the one or more second switches and wherein current flow in the control circuit closes the one or more second switches, thereby permitting power to be delivered from the circuit breaker panel to the low-ranking load on the one or more second conductors.

14. The apparatus of claim 6 wherein the first branch is connected through a delay device which provides some delay from the time that first switch opens before current flows through the first branch.

15. A method for sharing electrical load within a building having a circuit breaker panel connected to a power source and a high-ranking load connected to receive power from the power source through the circuit breaker panel via a plurality of first conductors connected between the circuit breaker panel and the high-ranking load, the method comprising:

connecting a current transformer to one of the plurality of first conductors between the circuit breaker panel and the high-ranking load to sense current on the one of the plurality of first conductors, the current transformer operable to close a first switch between a pair of nodes when sufficient current is detected on the one of the plurality of first conductors and to open the first switch between the pair of nodes otherwise;

providing a source of low-voltage power across the pair of nodes of the first switch;

providing a control circuit in parallel with the first switch, the control circuit controlling one or more second switches;

connecting one or more corresponding second conductors: (a) between the circuit breaker panel and first nodes of the one or more second switches; and (b) between second nodes of the one or more second switches and a low-ranking load;

such that when there is current flow in the control circuit, the one or more second switches are closed, thereby permitting power to be delivered from the circuit breaker panel to the low-ranking load on the one or more second conductors and when there is no current flow in the control circuit the one or more second switches are open circuited, thereby preventing power from being delivered from the circuit breaker panel to the low-ranking load on the one or more second conductors;

wherein when the first switch is closed, it provides a short circuit between the pair of nodes, thereby preventing current flow in the control circuit and, when the first switch is open, current flows in the control circuit.

16. The method of claim 15 wherein the one or more second switches comprise a plurality of switches and the one or more corresponding second conductors comprise a plurality of second conductors.

17. The method of claim 15 wherein the plurality of first conductors are connected to a circuit breaker within the circuit breaker panel and wherein connecting the one or more corresponding second conductors between the circuit breaker panel and first nodes of the one or more second switches comprises connecting the one or more corresponding second conductors to the same circuit breaker as the first conductors within the circuit breaker panel.

18. The method of claim 15 wherein the control circuit comprises a pair of branches connected in parallel with one another and wherein a first branch is connected through the coil of an interposing relay and a second branch is connected through a relay switch of the interposing relay, such that current through the first branch controls an open or closed state of the relay switch.

19. The method of claim 18 wherein the second branch is connected through control terminals of a contactor comprising the one or more second switches and wherein current flow in the second branch closes the one or more second switches, thereby permitting power to be delivered from the circuit breaker panel to the low-ranking load on the one or more second conductors.

20. The method of claim 18 wherein the second branch is connected through one or more coils of one or more corresponding low-ranking load relays comprising the one or more second switches and wherein current flow in the second branch closes the one or more second switches, thereby permitting power to be delivered from the circuit breaker panel to the low-ranking load on the one or more second conductors.

\* \* \* \* \*